(12) United States Patent
Hielscher et al.

(10) Patent No.: US 9,011,698 B2
(45) Date of Patent: Apr. 21, 2015

(54) METHOD AND DEVICES FOR SONICATING LIQUIDS WITH LOW-FREQUENCY HIGH ENERGY ULTRASOUND

(75) Inventors: Harald Hielscher, Stahnsdorf (DE); Holger Hielscher, Teltow (DE); Thomas Hielscher, Stahnsdorf (DE)

(73) Assignee: Dr. Hielscher GmbH, Teltow (DE)

( * ) Notice: Subject to any disclaimer, the term of this patent is extended or adjusted under 35 U.S.C. 154(b) by 1517 days.

(21) Appl. No.: 12/063,679

(22) PCT Filed: Nov. 28, 2006

(86) PCT No.: PCT/EP2006/068969
§ 371 (c)(1),
(2), (4) Date: Feb. 13, 2008

(87) PCT Pub. No.: WO2007/060245
PCT Pub. Date: May 31, 2007

(65) Prior Publication Data
US 2008/0251375 A1   Oct. 16, 2008

(30) Foreign Application Priority Data
Nov. 28, 2005   (DE) .......................... 10 2005 057 333

(51) Int. Cl.
*C02F 1/32* (2006.01)
*B01J 19/10* (2006.01)
(Continued)

(52) U.S. Cl.
CPC ................ *B01J 19/10* (2013.01); *B01J 19/008* (2013.01); *B01J 19/26* (2013.01); *B01J 2219/0869* (2013.01); *B01J 2219/0877* (2013.01); *Y10S 366/60* (2013.01)

(58) Field of Classification Search
CPC ................ C02F 1/31; C02F 1/48; C01B 3/04
USPC ........ 210/748.01–1; 422/20–28, 186, 186.04, 422/128; 310/321, 322; 204/157.42; 366/127, 600; 435/173.1
See application file for complete search history.

(56) References Cited

U.S. PATENT DOCUMENTS 6,505,648 B1   1/2003   Gergely
6,840,280 B1   1/2005   Simon
(Continued)

FOREIGN PATENT DOCUMENTS

DE          3922299 C1   4/1991
DE         19517381 C1   11/1996
(Continued)

*Primary Examiner* — Walter D Griffin
*Assistant Examiner* — Cameron J Allen
(74) *Attorney, Agent, or Firm* — Perkins Coie LLP

(57) ABSTRACT

A method and devices comprise a low frequency high energy ultrasound system having at least one sonotrode projecting into a reactor vessel through which the liquid passes via at least one inlet orifice and at least one outlet orifice. To avoid cavitation at the sonotrode, in a close region of the oscillation-transducing sonotrode surface a pressure/amplitude combination close to or above the pressure-amplitude characteristic line is generated at which considerably reduced or no cavitation occurs and in the adjacent region in the vessel at least in a region and at least at times a pressure/amplitude combination is maintained below the pressure-amplitude characteristic line at which cavitation is generated. A device has an inlet orifice arranged such that the liquid impacts directly onto the oscillation-transducing sonotrode surface, and is shaped that in the close region of the oscillation-transducing sonotrode surface a pressure close to or above the pressure-amplitude characteristic line prevails.

18 Claims, 7 Drawing Sheets

(51) Int. Cl.
   *B01J 19/00*   (2006.01)
   *B01J 19/26*   (2006.01)

(56) References Cited

U.S. PATENT DOCUMENTS

RE43,332 E * 5/2012 Tribelsky et al. ........ 210/748.01
2005/0260106 A1 * 11/2005 Marhasin ...................... 422/128

FOREIGN PATENT DOCUMENTS

| DE | 199 38 254.9 A1 | 2/2001 |
|---|---|---|
| DE | 10243837 | 3/2004 |
| DE | 102004025836 B3 | 12/2005 |
| JP | 35-32652 | 12/1960 |
| JP | 51-58150 | 10/1974 |
| JP | 56-67501 | 6/1981 |
| JP | 59-33231 | 2/1984 |
| JP | 1-203029 | 8/1989 |
| JP | 7-508930 | 10/1995 |
| JP | 2004-275850 | 10/2004 |
| JP | 2004-337800 | 12/2004 |
| WO | 02/46092 A | 6/2002 |
| WO | 2006/130237 A | 12/2006 |

* cited by examiner

METHOD AND DEVICES FOR SONICATING LIQUIDS WITH LOW-FREQUENCY HIGH ENERGY ULTRASOUND

FIELD OF THE INVENTION

The invention relates to a method and devices for sonicating liquids with low-frequency high-energy ultrasound comprising a low-frequency high-energy ultrasound system comprising at least one sonotrode which projects into a reactor vessel through which the liquid passes via at least one inlet orifice and at least one outlet orifice.

BACKGROUND

Low-frequency high-energy ultrasound refers to ultrasound having an operating frequency of 15 to 100 kHz, preferably 15 to 60 kHz, e.g., 20 kHz, and a sound output above 10 Watts, preferably 100 Watts to 20,000 Watts, e.g., 8,000 Watts. For example, piezoelectric or magnetorestrictive systems are used to generate ultrasound. Linear sound transducers and planar or arcuate plate-type vibrators or tube resonators have been known. Low-frequency high-energy ultrasound is mostly used in the treatment of liquids such as, for example, foodstuffs, cosmetics, paints and nano-materials. The effect of low-frequency high-energy ultrasound on treated liquids is predominantly based on cavitation occurring in the liquid. During the sonication of liquids, cavitation occurs. As is known, this results in the wear or erosion of the surface(s) of the sonotrode(s) which transmit vibrations of a higher amplitude (oscillation-transducing sonotrode surface) into the liquid medium.

The eroded material of the sonotrode material, e.g., titanium, is released into the sonicated liquid. Thus, the erosion results in replacement costs for the sonotrodes and in the contamination of the liquid that is to be sonicated.

From the past, various methods for reducing or suppressing material erosion have been known.

Referring to document DE 199 38 254.9, a pressure that completely or largely suppresses cavitation in a reactor vessel is generated in a reactor vessel by sonication of said reactor vessel with low-frequency high-energy ultrasound. As a result of this, wear and material erosion are significantly or completely reduced; however, also the cavitation effect on the liquid is considerably or completely reduced.

Referring to document DE 2004 025 836 A1, a method has been known with which the erosion due to cavitation on the oscillation-transducing sonotrode surface itself is to be reduced considerably or completely by means of a layer between the sonotrode and the sonicated medium. However, erosion occurs on the oscillation-transducing layer, thus necessitating a contouring/replacement of this layer.

Also known have been solutions for focusing the low-frequency high-energy ultrasound on a region that is far remote from the oscillation-transducing sonotrode surface. The disadvantage is the large spatial expansion of the device used for focusing.

Inasmuch as, for example, the wavelength of sound in water at 20 kHz is, for example, 60-80 mm, and the reasonable size of a lens should be at least 10 times the wavelength, an ultrasound lens for focusing would have a diameter of more than 600 mm. In addition, cavitation would interfere with the sound field.

It is possible to inject low-frequency high-energy ultrasound in a coupling liquid such as, for example, water; see, e.g., DE 102 43 837.4. This coupling liquid transmits the vibrations to a vessel wall, e.g., glass, whereby the liquid to be sonicated is located on the opposite side of said vessel wall. This leads to a loss of efficiency and thus to a reduced intensity of sonication. Wear/erosion occurs on the vibrating vessel wall.

Coating or hardening the surface of the sound-transmitting surface achieves a delay or a reduction of wear. However, any coating is expensive and its effect is limited by time. In addition, anything that is worn off the applied material ends up in the liquid.

SUMMARY

Consequently, it is the object of the invention to propose a method and appropriate devices therefore, which make possible a considerable reduction of cavitation of more than 50% up to and including an almost complete suppression at the oscillation-transducing sonotrode surface in the close region, and thus make possible a reduction of the erosion of the oscillation-transducing sonotrode surface associated therewith.

Accordingly, a pressure/amplitude combination is generated close to or above the pressure/amplitude characteristic line in a close region of the oscillation-transducing sonotrode surface(s) inside the reactor vessel, at which characteristic line cavitation is considerably reduced or completely eliminated, and, in the adjoining region in the reactor vessel, at least in some region and at least for some time, a pressure/amplitude combination below the pressure/amplitude characteristic line is generated, whereby cavitation occurs with this combination.

The formation of cavities in liquids such as, for example, water or oil and emulsions, suspensions or dispersions, at a pre-specified temperature, e.g., 20° C., and at a pre-specified sound frequency, e.g., 20 kHz, is a function of the vibration amplitude A and of the liquid pressure p. Considering the aforementioned conditions, there is, for each vibration amplitude A, a maximum liquid pressure pmax(A), above which cavitation is completely suppressed because at p>pmax(A), the liquid is pressed against the oscillation-transducing sonotrode surface in such a manner that the occurrence of local vacuum bubbles is impossible. Conversely, there is, for each liquid pressure p, a minimum vibration amplitude Amin (p) at which cavitation is impossible.

Referring to a first modification, a device operating in accordance with the method may be designed in that the liquid impinges directly on the oscillation-transducing sonotrode surface, and that the inlet orifice is configured in such a manner that, in the close region of the oscillation-transducing sonotrode surface, the prevailing pressure is close to or above the pressure/amplitude characteristic line, at which cavitation is considerably reduced or completely prevented.

Referring to a second embodiment, the cross-section of the reactor vessel is reduced by at least one constriction in such a manner that a close region is created at the oscillation-transducing sonotrode surface, whereby, in said close region, a prevailing pressure close to or above the pressure/amplitude characteristic line exists, at which cavitation is considerably reduced or does not occur. Along the direction of flow of the liquid, several constrictions may be provided in series. These constrictions may be stepped. Further, constrictions may be arranged in parallel. The constrictions may be implemented as an apertured diaphragm. Preferably, the distance of the constrictions with respect to each other can be adjusted. In one embodiment, the constrictions are implemented as a sieve.

Referring to another modification, the effective cross-sectional surface of the reactor vessel at a distance from the sonotrode surface is configured so as to continuously decrease, at least in sections, or so as to decrease in steps.

One such device, or even several such devices, may be arranged in series or may comprising a combination of various modifications. Likewise, optionally, individual components may be provided multiple times, for examples, nozzles and/or sonotrodes and/or inlets and/or outlets. In so doing, several sonotrodes may be arranged parallel or opposite each other, or they may be directed together at a cavitation zone. The sonotrodes may also be arranged in a decentralized manner or be directed at an oblique angle at the cavitation zone. Likewise, the sonotrodes may be supported in a vibration-uncoupling manner and project into a pressure-sealed manner into the reactor vessel. Sonotrodes with a non-planar, for example, concave or convex, surface are conceivable.

The outlet or outlets may be laterally arranged or they may be placed opposite the sonotrode. One outlet may additionally be provided with a throttle, for example, a needle valve or a ball valve. The throttle may be manually or automatically controlled. Also, the inlet pressure or the flow rate can be manually or automatically controlled. To achieve this, the nozzle distance and/or the nozzle orifice can be controlled. Further, the decrease of the cross-sectional surface can be implemented by an insert in the reactor vessel. The insert in the reactor vessel may be configured so as to be adjustable or controllable. That is, the distance of the insert can be adjusted relative to the sonotrode surface. Preferably in that case the direction of flow of the liquid is directed toward the sonotrode. Preferably, the insert is designed so as to be interchangeable. The control may occur as a function of the pressure in the reactor vessel or as a function of the efficiency or of the formation of cavities.

The nozzles may comprise cavitation-resistant materials or may be appropriately coated. This also applies to the sonotrode or to the reactor vessel—in the case of the latter, optionally only at the constricted locations.

The length of the reactor vessel may be adapted to the resonant length.

The feed pump may be a gear pump or a centrifugal pump.

The measures are also suitable for a plate-type vibrator, rotary immersion vibrator, plate-type immersion vibrator and tubs.

The measures in accordance with the invention have the advantage that no or considerably reduced cavitation occurs directly on the oscillation-transducing sonotrode surface, however, cavitation effective for the liquid occurs during continued progression in the reactor vessel. In this manner, the wear at the oscillation-transducing sonotrode surface is effectively reduced or completely prevented.

Hereinafter, the invention will be explained in detail with reference to several exemplary embodiments and to the accompanying drawings. They show in

DETAILED DESCRIPTION

Figure 1:
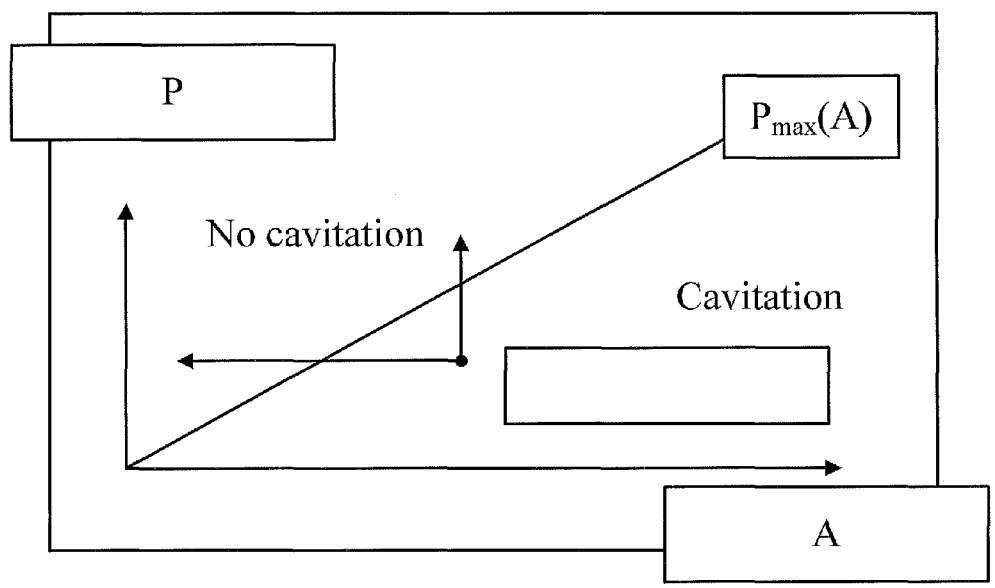
FIG. 1 the occurrence of cavitation as a function of the pressure in the reactor vessel and of the vibration amplitude of a sonotrode.

FIG. 1 shows a schematic of the progression of the liquid pressure pmax(A), by means of which the formation of cavities is completely suppressed, because, at p>pmax(A), the liquid is pressed against the oscillation-transducing sonotronic surface in such a manner that the occurrence of local vacuum bubbles is impossible. Conversely, there is thus, for each liquid pressure p, a minimum vibration amplitude Amin(p), at which cavitation is impossible. The maximum liquid pressure pmax(A) and the minimum vibration amplitude Amin(p) can be empirically investigated for various liquids. For example, the cavitation erosion at the oscillation-transducing surface, or the high-frequency ultrasound emission, can be used as the measuring values. The latter uses the occurrence of vibrations in the megahertz range during the implosion of cavitation bubbles.

As a result of the inventive variation of the vibration amplitude A at various distances D from the oscillation-transducing sonotrode surface, or as a result of the variation of the liquid pressure p at various distances D from the oscillation-transducing sonotrode surface, or as a result of the combination of both variations, it is achieved that the occurrence of cavitation in the above-described close region is considerably reduced or completely suppressed, while cavitation for the treatment of liquid is made possible outside this close region in the sonic field. To do so, the liquid pressure p in the close region is selected close, i.e., p>0.7*pmax(A), or above pmax(A), or the vibration amplitude A is selected close, i.e., A<1.3*Amin(p) or under Amin(p). Outside the close region in the sonic field, the liquid pressure is below pmax(A) or the amplitude increases to above Amin(p).

The close region comprises the distance D of 0 to 50 mm, preferably of 0 to 10 mm, e.g., within the region of 0 to 2 mm, in front of the oscillation-transducing sonotrode surface.

The variation of the vibration amplitude A at various distances D from the oscillation-transducing sonotrode surface and the variation of the liquid pressure p at different distances D from the oscillation-transducing sonotrode surface, and the combination of both variations permits, for example, the devices shown by FIGS. 2 through 7.

The devices utilize the following principles:
Pressure increase in the close region of the oscillation-transducing sonotrode surface, shown by FIGS. 2 and 3
Reduction of cross-section in the reactor outside the close region of the oscillation-transducing sonotrode surface, shown by FIGS. 4 and 5
Amplitude increase through the medium outside the close region of the oscillation-transducing sonotrode surface, shown by FIGS. 6 and 7

Also possible is a combination of all the principles.

All the modifications shown by FIGS. 2 through 7 have in common a sonotrode 1 of a low-frequency high-energy ultrasound system 2, whereby the sonotrode surface 3 projects into a reactor vessel 5. A medium is supplied through a suitable orifice 4. During operation of the sonotrode 1, a sound field 6 develops in the reactor vessel 5.

In addition to the low-frequency high-energy ultrasound system 2, the progression of the pressure p over the distance D of the sonotrode surface 3 is shown.

Figure 2:
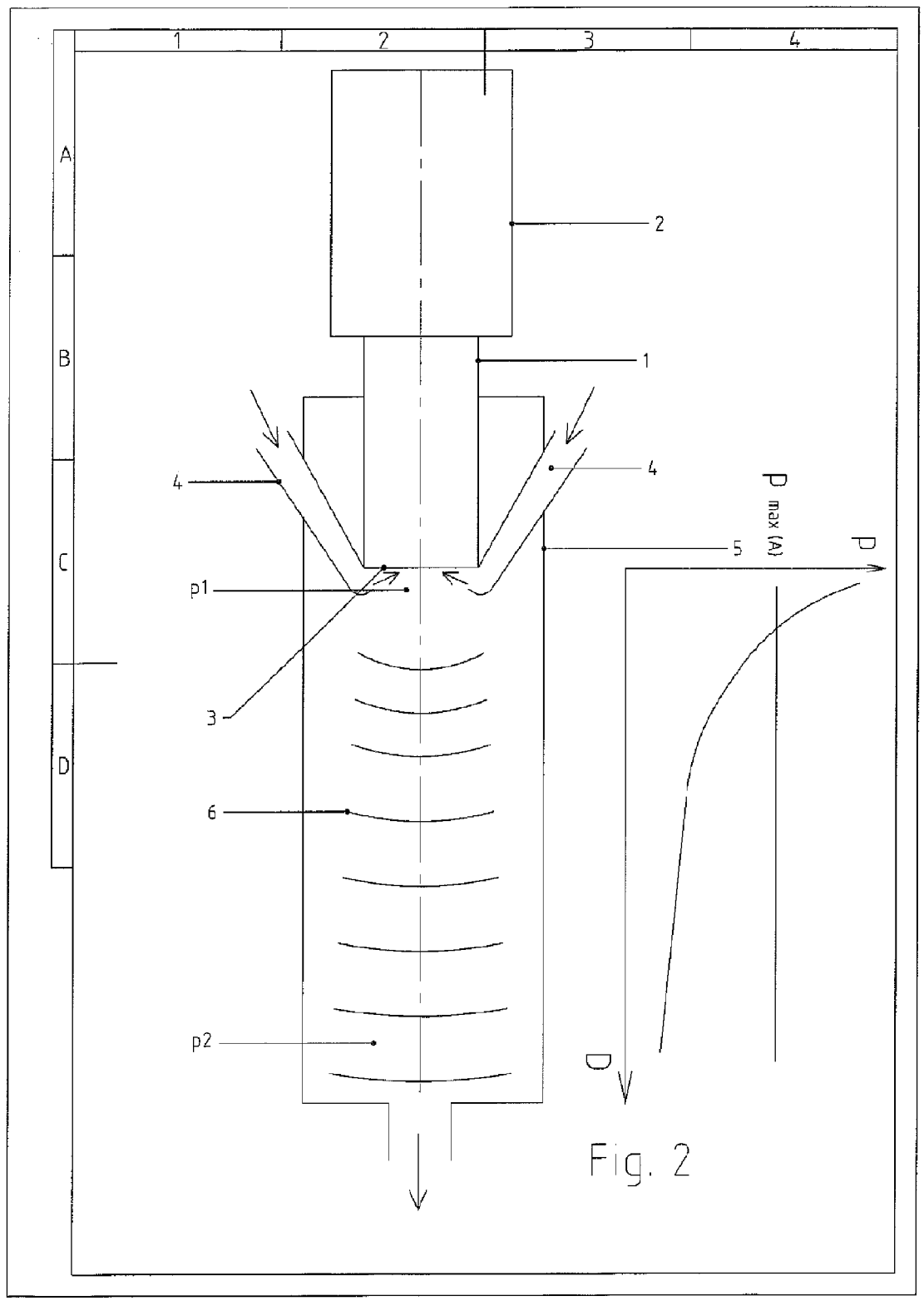
FIG. 2 a first modification of a device in accordance with the invention.

FIG. 2 shows a device, in which, due to the supply of the medium through the orifice 4, configured here as an annular nozzle, the pressure p in the close region of the oscillation-transducing sonotrode surface 3 is increased to the value p1, so that cavitation is considerably reduced or completely prevented at that location. Outside the close region of the oscillation-transducing sonotrode surface 3, the pressure p drops to the value p2, and cavitation occurs in the sonic field 6.

The device is operated with low-frequency high-energy ultrasound at an operating frequency of from 15 to 100 kHz, preferably 15 to 30 kHz, e.g., 20 kHz.

In so doing, a sound output of 50 to 20,000 Watts, preferably 100 to 20,000 Watts, e.g., 8,000 Watts is used. At the oscillation-transducing sonotrode surface 3, an amplitude of 0 to 200 µm, preferably 10 to 100 µm, e.g., 10 µm, is used for the transmission of the sound to the liquid. The vibrating sonotrode 1 is sealed relative to the reactor vessel 5 by means of a pressure-tight seal such as an O-ring and a vibration-uncoupling flange. A reactor vessel 5 having a content of 0 to 50 Liters, preferably 1 to 10 Liters, e.g., 5 Liters, is used. The reactor vessel 5 may comprise various materials, preferably steel, aluminum or hardened metals, e.g., stainless steel.

The medium that may be thickly viscous to thinly viscous, preferably thinly viscous, e.g., water or oil, is injected through a suitable orifice 4, preferably nozzles, e.g., a high-pressure nozzle, conduits or special feeds, in the upper region of the reactor wall into the reactor vessel 5 and deflected against the oscillation-transducing sonotrode surface 3. Inasmuch as the medium impinges on the oscillation-transducing sonotrode surface 3 at an angle between 5° and 90°, preferably 20° and 80°, e.g., 45°, at a pressure p near or above the pmax(A), cavitation in the close region of the oscillation-transducing sonotrode surface 3 is considerably reduced or completely prevented. This pressure p may be, e.g., 20 bar, with a vibration amplitude of 10 µm. The selected sonotrode 1 projects into the reactor vessel 5, preferably at a length corresponding to Lambda/4, e.g., 60 mm.

Due to the pressure drop in the reactor vessel 5 outside the close region of the oscillation-transducing sonotrode surface 3, the value pmax(A) is not reached and thus allows cavitation in the reactor vessel 5 in the region outside the close region of the oscillation-transducing sonotrode surface 3. For example, the pressure outside the close region of the oscillation-transducing sonotrode surface 3 may drop to 1.5 bar, so that a cavitation in water is possible at a vibration amplitude of 10 µm. The sonicated medium is removed in the lower region of the reactor vessel 5, preferably at the lateral wall or at the lower bottom, e.g., in the center of the lower bottom. The exit of the medium may be controlled at a pressure p2 or it may be uncontrolled, e.g., controlled, in order to be able to influence the pressure p inside the cell. With the use of sensors, e.g., pressure sensors, it is possible to record and analyze values of the medium inside or outside the close region and to use said values for process optimization.

This type of application may be implemented with any number of sonotrodes 1 in a reactor vessel 5, e.g., with a single sonotrode 1, preferably with up to five sonotrodes 1.

The pump pressure may be generated as a function of the required pressure pmax(A) by selecting suitable pumps, e.g., by means of a controllable gear pump.

Figure 3:
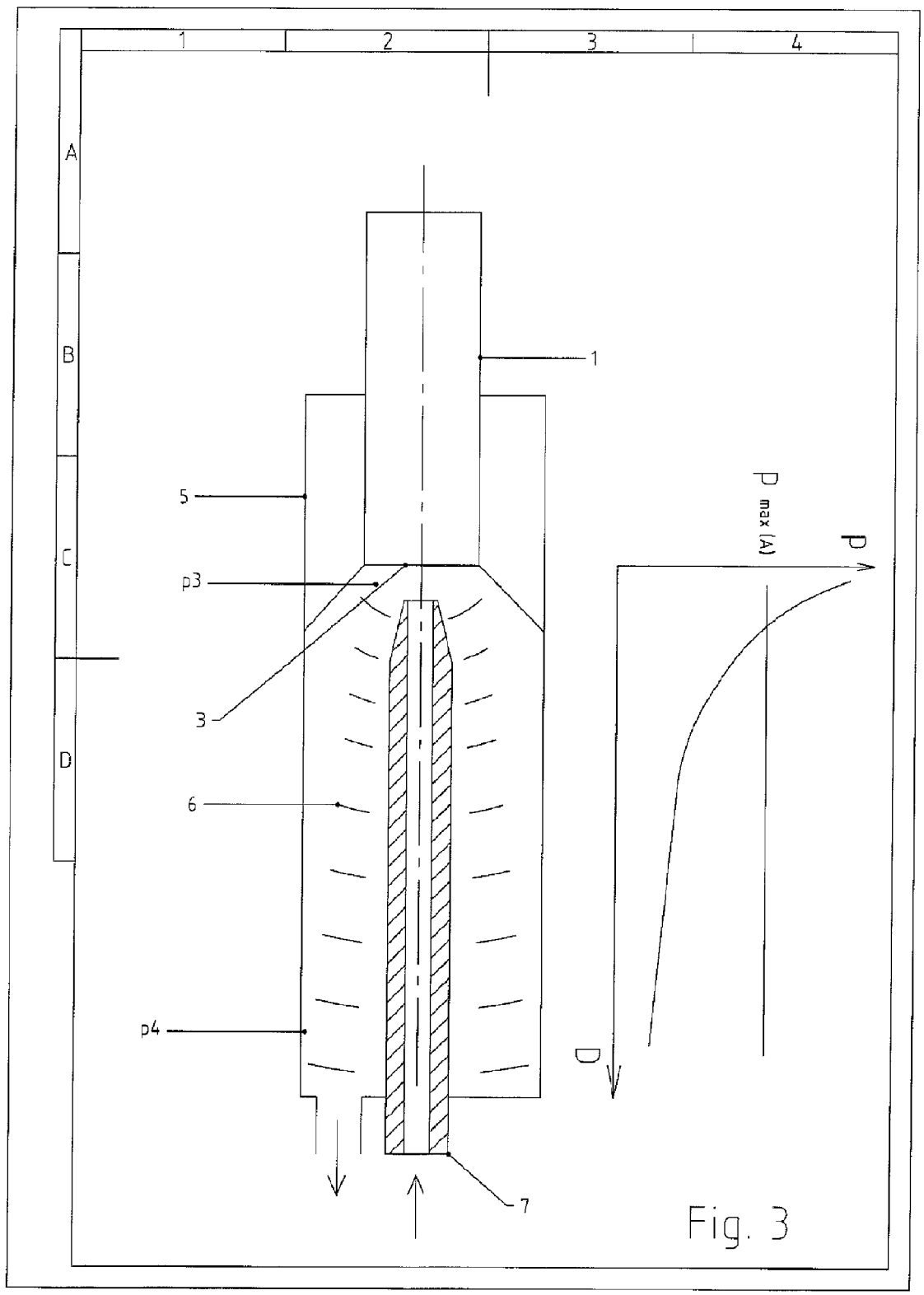
FIG. 3 a similar device as in FIG. 2.

FIG. 3 shows a device, in which a suitable feed of the medium, here configured as the central nozzle 7, is used to increase the pressure p to the value p3 in the close region of the oscillation-transducing sonotrode surface 3, so that, at this location, cavitation is considerably reduced or completely prevented. Outside the close region of the oscillation-transducing sonotrode surface 3, the pressure p drops to the value p4, and cavitation occurs in the sonic field 6.

The device is operated with low-frequency high-energy ultrasound at an operating frequency of 15 to 100 kHz, preferably 15 to 30 kHz, e.g., 20 kHz.

In so doing, a sound output of 50 to 20,000 Watts, preferably 100 to 20,000 Watts, e.g., 8,000 Watts, is used. At the oscillation-transducing sonotrode surface 3, an amplitude of 0 to 200 µm, preferably 10 to 100 µm, e.g., 20 µm, is used for the transmission of the sound to the liquid. The vibrating sonotrode 1 is sealed relative to the reactor vessel 5 by means of a pressure-tight seal such as an O-ring and a vibration-uncoupling flange. A reactor vessel 5 having a content of 0 to 50 Liters, preferably 1 to 10 Liters, e.g., 5 Liters, is used. The reactor vessel 5 may comprise various materials, preferably steel, aluminum or hardened metals or ceramic.

The medium that may be thickly viscous to thinly viscous, preferably thinly viscous, e.g., oil, is injected through a nozzle, e.g., a high-pressure nozzle, a conduit or special feeds, through the reactor bottom into the close region of the oscillation-transducing sonotrode surface 3. Inasmuch as the medium impinges on the oscillation-transducing sonotrode surface 3 at a freely selectable angle, preferably 90°, at a pressure p near or above the pmax(A), e.g., 50 bar, the cavitation in the close region of the oscillation-transducing sonotrode surface 3 is considerably reduced or completely prevented.

The selected sonotrode 1 projects into the reactor vessel 5, preferably at a length corresponding to Lambda/4, e.g., 60 mm.

Due to the pressure drop in the reactor vessel 5 outside the close region of the oscillation-transducing sonotrode surface 3, the value pmax(A) is not reached and thus allows cavitation in the reactor vessel 5 in the sonic field 6. For example, the pressure p in the reactor vessel outside the close region may be, e.g., 5 bar.

The sonicated medium is removed in the lower region of the reactor vessel 5, preferably at the lateral wall or at the lower bottom, e.g., off-center on the lower bottom. The exit of the medium can be controlled at a pressure p4 or it may be uncontrolled, e.g., controlled, in order to be able to influence the pressure p inside the cell. With the use of sensors, e.g., pressure sensors, it is possible to record and analyze values of the medium inside or outside the close region and to use said values for process optimization. This type of application may be implemented with any number of sonotrodes 1 in a reactor vessel 5, e.g., with a single sonotrode 1, preferably with up to five sonotrodes 1.

Figure 4:
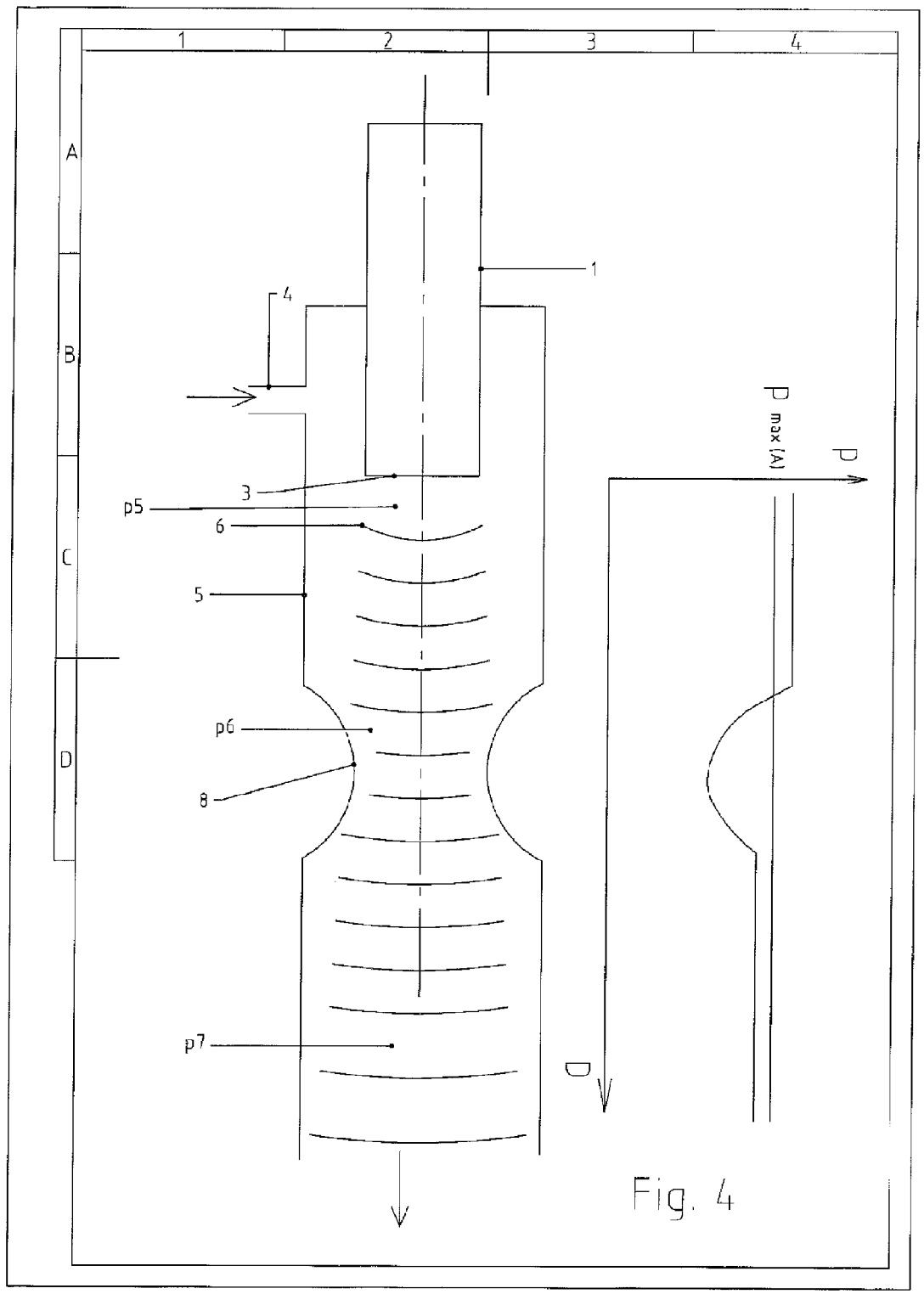
FIG. 4 a second type of a device in accordance with the invention.

FIG. 4 shows another modification of a device, in which case, due to a reduction of the cross-section outside the close region, a pressure reduction is generated in the sound field 6 in the passing liquid, so that at this location a cavitation occurs, while in the close region of the oscillation-transducing sonotrode surface 3 cavitation is considerably reduced or completely eliminated.

The device is operated with low-frequency high-energy ultrasound at an operating frequency of from 15 to 100 kHz, preferably 15 to 30 kHz, e.g., 19 kHz.

In so doing, a sound output of 50 to 20,000 Watts, preferably 100 to 20,000 Watts, e.g., 8,000 Watts, is used. At the oscillation-transducing sonotrode surface 3, an amplitude of 0 to 200 µm, preferably 10 to 100 µm, e.g., 20 µm, is used for the transmission of the sound to the liquid. The vibrating sonotrode 1 is sealed relative to the reactor vessel 5 by means of a pressure-tight seal such as an O-ring and a vibration-uncoupling flange. A reactor vessel 5 having a content of 0 to 50 Liters, preferably 1 to 10 Liters, e.g., 5 Liters, is used. The reactor vessel 5 may comprise the most diverse materials, preferably steel, aluminum or hardened metals, e.g., titanium.

In the center or off the center of the inside of the reactor vessel 5, a cross-sectional constriction 8 is provided, which causes passing liquid to experience a local pressure drop in accordance with the Venturi Principle. The cross-sectional constriction 8 may vary as to dimensions, shape and height in the reactor vessel. The medium that may be thickly viscous to thinly viscous, preferably thinly viscous, e.g., paint, is injected through a suitable orifice 4, preferably a nozzle, e.g. a standard nozzle, conduits or special feeds, through the upper region of the reactor wall into close region of the oscillation-transducing sonotrode surface 3. By injecting the medium at a pressure p close to or above the pressure pmax (A) of the medium, considerably reduced or no cavitation develops in the close region of the oscillation-transducing sonotrode surface 3.

The selected sonotrode 1 projects into the reactor preferably at a length corresponding to Lambda/4, e.g., 60 mm.

Due to the cross-sectional constriction 8 on the inside of the reactor vessel, the medium will stagnate before reaching the smallest diameter at said cross-sectional constriction 8. Thus, the pressure p in the reactor vessel 5 above this point is too high to permit cavitation of the medium. The close region of the oscillation-transducing sonotrode surface 3 thus experiences considerably reduced or no cavitation. Below the cross-sectional constriction 8, a relaxation occurs in accordance with the Venturi Principle, i.e., a pressure reduction due to the relaxation of the medium occurs, thus permitting cavitation. In this region, the pressure p is below the value pmax(A). The sonicated medium is removed in the lower region of the reactor vessel 5, preferably in the center on the lower bottom or on the lower lateral wall of the cylindrical reactor vessel 5. The exit of the medium may be controlled or uncontrolled, e.g., controlled, in order to be able to influence the pressure p inside the cell. With the use of various sensors, e.g., pressure sensors, it is possible to record and analyze values of the medium inside or outside the close region and to use said values for process optimization.

This type of application may be implemented with any number of sonotrodes in a reactor vessel 5, e.g., with a single sonotrode 1, preferably with up to five sonotrodes 1. Alternatively, using an appropriate distance of the cross-sectional constriction 8 from the sonotrode 1, the direction of flow may also be reversed, as long as the local pressure reduction due to the Venturi Principle occurs outside the close region of the oscillation-transducing sonotrode surface 3.

Figure 5:
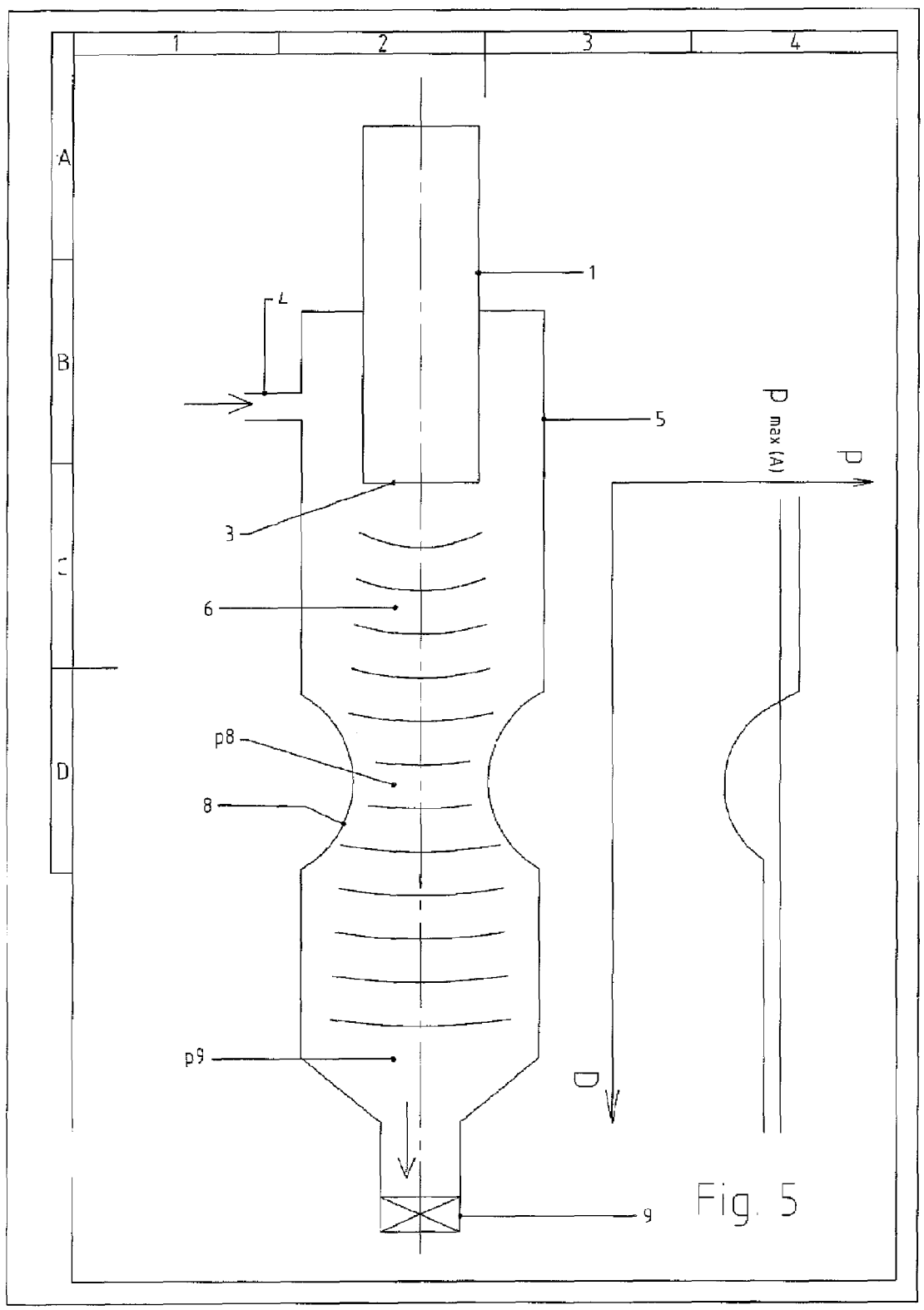
FIG. 5 a similar modification as in FIG. 4.

FIG. 5 shows a similar device with which, due to the cross-sectional reduction 8, a pressure reduction is created outside the close region in the sound field in the passing liquid, so that cavitation occurs at this location, while in the close region of the oscillation-transducing sonotrode surface 3, cavitation is considerably reduced or completely prevented. An additionally installed throttle 9 generates a static counter-pressure that permits higher mechanical amplitudes of the sonotrode 1.

The device is operated with low-frequency high-energy ultrasound at an operating frequency of from 15 to 100 kHz, preferably 15 to 30 kHz, e.g., 17 kHz.

In so doing, a sound output of 50 to 20,000 Watts, preferably 100 to 20,000 Watts, e.g., 16,000 Watts, is used. At the oscillation-transducing sonotrode surface 3, an amplitude of 0 to 200 µm, preferably 10 to 100 µm, e.g., 15 µm, is used for the transmission of the sound to the liquid. The vibrating sonotrode 1 is sealed relative to the reactor vessel 5 by means of a pressure-tight seal such as an O-ring and a vibration-uncoupling flange. A cylindrical reactor vessel 5 that is conically tapered toward the end and has a content of 0 to 50 Liters, preferably 1 to 10 Liters, e.g., 3 Liters, is used. The reactor vessel 5 may comprise various materials, preferably steel, aluminum, hardened metals or glass. In the center or off the center of the inside of the reactor vessel 5, a cross-sectional constriction 8 is provided which causes passing liquid to experience a local pressure drop in accordance with the Venturi Principle. The cross-sectional constriction 8 may vary as to dimensions, shape and height in the reactor vessel 5. The medium that may be thickly viscous to thinly viscous, preferably thinly viscous, e.g., rapeseed oil, is injected through a suitable orifice 4, preferably a nozzle, e.g., a standard nozzle, a conduit or special feeds, through the upper region of the reactor wall into the close region of the oscillation-transducing sonotrode surface 3. By injecting the medium at a pressure close to or above the pressure pmax(A) of the medium, considerably reduced or no cavitation develops in the close region of the oscillation-transducing sonotrode surface 3. The selected sonotrode 1 projects into the reactor vessel 5, preferably at a length corresponding to Lambda/4, e.g., 60 mm.

Due to the cross-sectional constriction 8 on the inside of the reactor vessel 5 the medium will stagnate before reaching the smallest diameter. Thus, the pressure p in the reactor vessel 5 above this point is too high to permit cavitation of the medium. The close region of the oscillation-transducing sonotrode surface 3 thus experiences considerably reduced or no cavitation Below the smallest cross-section, a relaxation occurs in accordance with the Venturi Principle, i.e., a pressure reduction of the medium occurs, thus permitting cavitation. The pressure p is below the value pmax(A). The sonicated medium is removed in the lower region of the reactor vessel 5, preferably in the center of the lower bottom or on the lower lateral wall of the cylindrical reactor vessel 5. The exit of the medium may be controlled or uncontrolled, e.g., controlled, in order to be able to influence the pressure p inside the cell. With the use of various sensors, e.g., pressure sensors, it is possible to record and analyze values of the medium inside or outside the close region and to use said values for process optimization. The additionally installed throttle 9 generates a static counter-pressure which permits higher mechanical amplitudes of the sonotrode 1. This type of application may be implemented with any number of sonotrodes 1 in a reactor vessel 5, e.g., with a single sonotrode 1, preferably with up to five sonotrodes 1. Alternatively, using an appropriate distance of the cross-sectional constriction 8 from the sonotrode 1, the direction of flow may also be reversed, as long as the local pressure reduction due to the Venturi Principle occurs outside the close region of the oscillation-transducing sonotrode surface 3.

Figure 6:
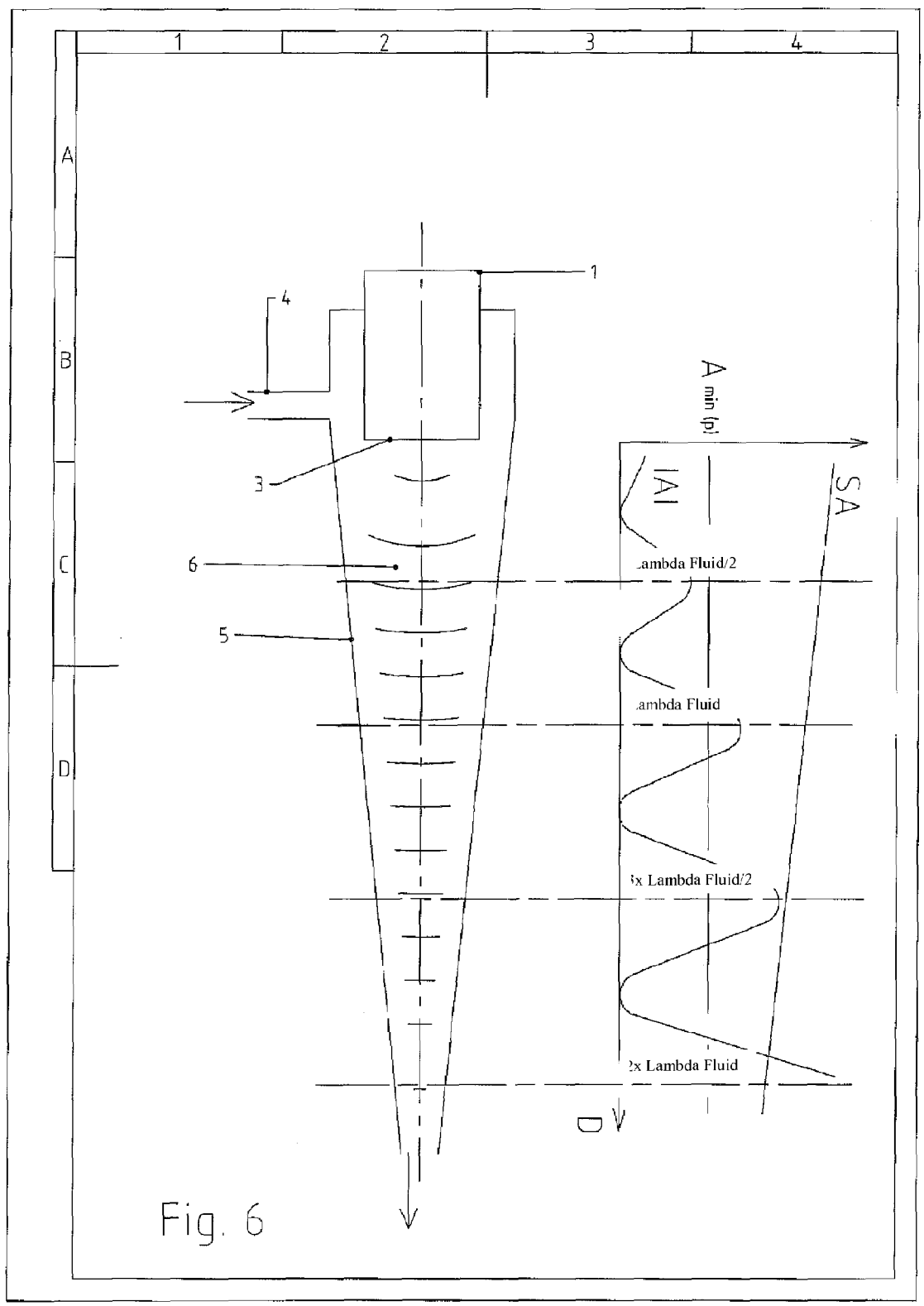
FIG. 6 another type of a device in accordance with the invention.

FIG. 6 shows another modification of a device, in which case, by appropriately dimensioning the reactor, here configured as a conically tapering reactor vessel 5, a continuous amplitude increase in the medium is made possible outside the close region of the oscillation-transducing sonotrode surface 3, so that cavitation is considerably reduced or completely prevented at this location, while cavitation occurs outside the close region of the oscillation-transducing sonotrode surface 3. In so doing, the length of the reactor vessel should preferably be n*λ(liquid)/2(n∃1), here 4*λ(liquid)/2. In conjunction with this, the direction of flow or the flow rate of slow-flowing media is of no consequence. In the individual case, any flow-through may be omitted. A preferred form of the reactor 5 is, for example, an expotential form or a stepped variation of the cross-section. The device is operated with low-frequency high-energy ultrasound at an operating frequency of from 15 to 100 kHz, preferably 15 to 30 kHz, e.g., 20 kHz. In so doing, a sound output of 50 to 20,000 Watts, preferably 100 to 20,000 Watts, e.g., 8,000

Watts, is used. At the oscillation-transducing sonotrode surface 3, an amplitude of 0 to 200 µm, preferably 10 to 100 µm, e.g., 20 µm, is used for the transmission of the sound to the liquid. The vibrating sonotrode 1 is sealed relative to the reactor vessel 5 by means of a pressure-tight seal such as an O-ring and a vibration-uncoupling flange. A reactor vessel 5 having a content of 0 to 50 Liters, preferably 1 to 10 Liters, e.g., 4 Liters, is used. The reactor vessel 5 may comprise the most diverse materials, preferably steel, aluminum, hardened metals, e.g., hasteloy. Said reactor vessel may taper at different angles to form a truncated cone, preferably an acute angle, e.g., 15°. The medium that may be thickly viscous to thinly viscous, preferably thinly viscous, e.g., Diesel [oil], is injected through a suitable orifice 4, preferably a nozzle, e.g., a standard nozzle, a conduit or special feeds, through the upper region of the reactor wall into the close region of the oscillation-transducing sonotrode surface 3. By injecting the medium at a pressure p of the medium that is below the pressure required for cavitation, considerably reduced or no cavitation develops in the close region of the oscillation-transducing sonotrode surface 3. The selected sonotrode 1 projects into the reactor vessel 5, preferably at a length corresponding to Lambda/4, e.g. 60 mm.

Due to the design-specific tapering of the cross-section of the reactor, the amplitude outside the close region of the oscillation-transducing sonotrode surface 3 is increased at a ratio of area to value Amin(p), e.g., by a factor of 10. Cavitation occurs in this region. This value is respectively exceeded in Lambda half-steps. Consequently, individual or multiple cavitation zones may develop in the reactor vessel 5. The number, shape and size of the cavitation zones is design-specific. The sonicated medium is removed in the lower region of the reactor vessel 5, preferably in the center of the lower bottom of the reactor vessel 5 that has the shape of a truncated cone. The exit of the medium may be controlled or uncontrolled, e.g., controlled, in order to be able to influence the pressure p inside the cell. With the use of various sensors, e.g., pressure sensors, it is possible to record and analyze values of the medium inside or outside the close region and to use said values for process optimization. This type of application may be implemented with any number of sonotrodes 1 in a reactor vessel 5, e.g., with a single sonotrode 1, preferably with up to five sonotrodes 1.

Figure 7:
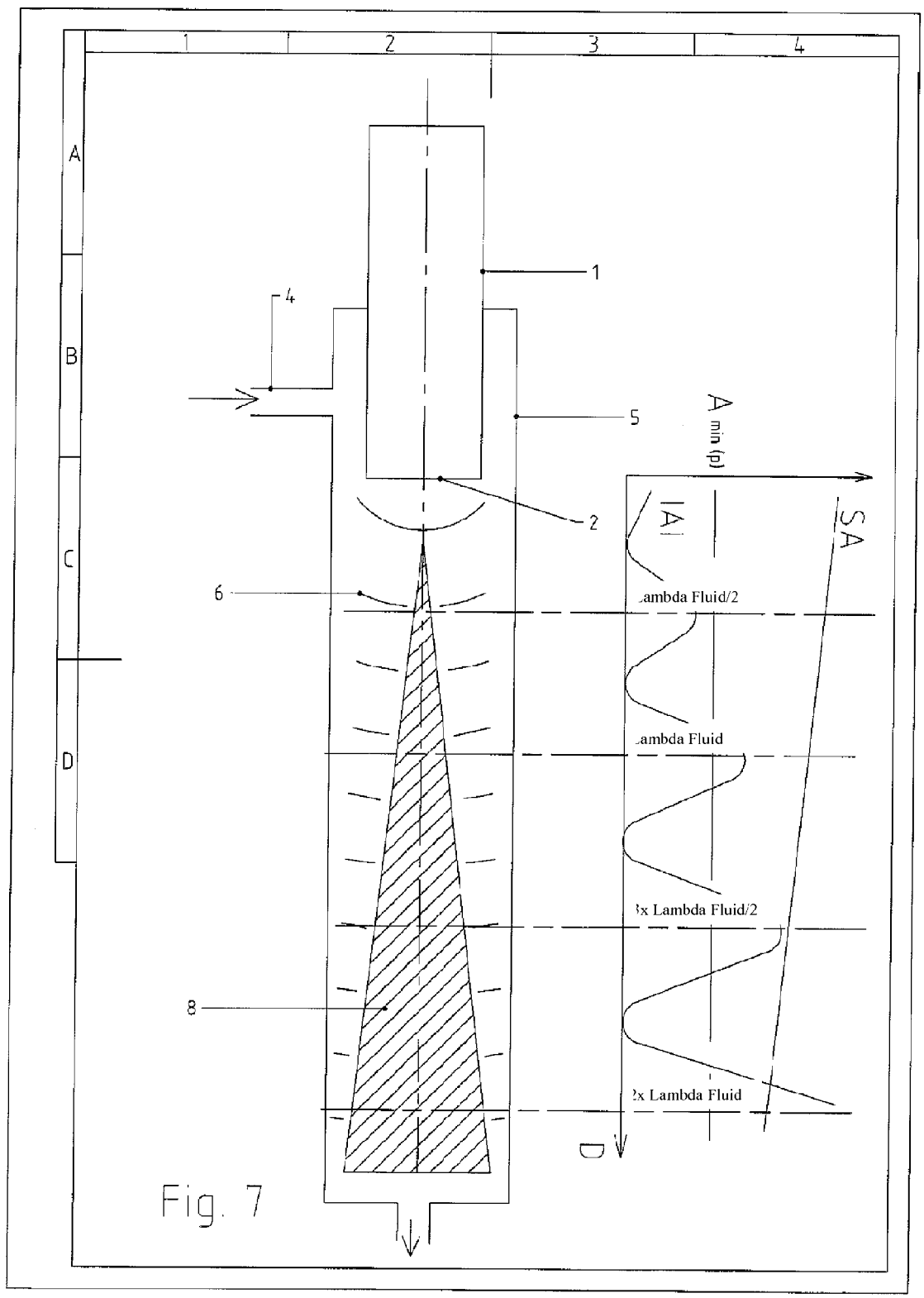
FIG. 7 a similar device as in FIG. 6.

FIG. 7 shows a device as described in conjunction with FIG. 6, with the exception that the design of the reactor vessel 5 is different. In this case, a cone 10 is provided in a cylindrical reactor vessel 5. The device is operated with low-frequency high-energy ultrasound at an operating frequency of from 15 to 100 kHz, preferably 15 to 30 kHz, e.g., 20 kHz. In so doing, a sound output of 50 to 20,000 Watts, preferably 100 to 20,000 Watts, e.g., 8,000 Watts, is used. At the oscillation-transducing sonotrode surface 3, an amplitude of 0 to 200 µm, preferably 10 to 100 µm, e.g., 10 µm, is used for the transmission of the sound to the liquid. The vibrating sonotrode 1 is sealed relative to the reactor vessel 5 by means of a pressure-tight seal such as an O-ring and a vibration-uncoupling flange. A reactor vessel 5 having a content of 0 to 50 Liters, preferably 1 to 10 Liters, e.g., 5 Liters, is used. The reactor vessel 5 may comprise the most diverse materials, preferably steel, aluminum, hardened metals or a polymer. The cone 10 is centrally arranged on the inside of the reactor vessel 5 which may comprise various materials, preferably metals, non-metals or ceramic. The cone 10 tapers at an acute angle in the direction toward the oscillation-transducing sonotrode surface 3, preferably at an angle between 5° and 30°, e.g., 15°. As a result of this, a reduction of the cross-section at an increasing distance D from the sonotrode 1 is created, said reduction-considering a corresponding configuration-generating an amplitude increase inside the liquid medium. The medium, thickly viscous to thinly viscous, preferably thinly viscous, e.g., an emulsion, is injected through a suitable orifice 4, preferably a nozzle, e.g., a standard nozzle, a conduit or special feeds, through the upper region of the reactor wall into the close region of the oscillation-transducing sonotrode surface 3. In so doing, the direction of flow and flow rate are of no consequence in slow-flowing media. In the individual case, any flow-through may be omitted. By injecting the medium at a pressure p of the medium that is below the pressure required for cavitation, considerably reduced or no cavitation develops in the close region of the oscillation-transducing sonotrode surface 3. The selected sonotrode 1 projects into the reactor preferably at a length corresponding to Lambda/4, e.g., 60 mm. Due to the design-specific tapering of the cross-section of the reactor, the amplitude outside the close region of the oscillation-transducing sonotrode surface 3 is increased at a ratio of area to value Amin(p), e.g., by a factor of 10. Cavitation occurs in this region. This value is respectively exceeded in Lambda half-steps. Consequently, individual or multiple cavitation zones may develop in the reactor vessel 5. The number, shape and size of the cavitation zones is design-specific. The sonicated medium is removed in the lower region of the reactor vessel 5, preferably in the center of the lower bottom of the reactor vessel 5 that has the shape of a truncated cone. The exit of the medium may be controlled or uncontrolled, e.g., controlled, in order to be able to influence the pressure p inside the cell. With the use of various sensors, e.g., pressure sensors, it is possible to record and analyze values of the medium inside or outside the close region and to use said values for process optimization. This type of application may be implemented with any number of sonotrodes 1 in a reactor vessel 5, e.g., with a single sonotrode 1, preferably with up to five sonotrodes 1.

LIST OF REFERENCE NUMBERS

1 Sonotrode
2 Low-frequency high-energy ultrasound system
3 Sonotrode surface
4 Orifice
5 Reactor vessel
6 Sound field
7 Central nozzle
8 Cross-sectional constriction
9 Throttle
10 Cone
P Pressure
A Vibration amplitude

The invention claimed is:

1. A method for sonicating liquids with low-frequency high-energy ultrasound comprising a low-frequency high-energy ultrasound system comprising at least one sonotrode which projects into a reactor vessel through which the liquid passes via at least one inlet orifice and at least one outlet orifice, the method comprising:
generating, in a first region adjacent to the oscillation-transducing sonotrode surface within the reactor vessel, a pressure resulting in a pressure/amplitude combination above a pressure-amplitude characteristic line, and
maintaining, in a second region adjacent to the first region in the reactor vessel, a pressure resulting in a pressure/amplitude combination below the pressure-amplitude characteristic line, wherein for the pressure/amplitude combination above the pressure-amplitude characteristic line, cavitation is reduced compared to the pressure/ amplitude combination below the pressure-amplitude characteristic line, or no cavitation occurs;

the oscillation-transducing sonotrode surface oscillates in an angle between 5 degrees and 30 degrees to a cone inside the reactor vessel, the result of this being that the cross-sectional surface of the reactor vessel along a distance from the sonotrode surface in the direction of the flow of the liquid increases the vibration amplitude of the ultrasound injection.

2. The method of claim 1, wherein the pressure in the first region is generated by the increased pressure of the liquid flowing into the reactor vessel.

3. The method of claim 1, wherein the pressure in the first region is maintained by reducing the effective inside cross-sectional surface in a region of the reactor vessel.

4. The method of claim 1, wherein, along a distance from the sonotrode surface in the direction of flow of the liquid, the liquid pressure is varied by changing the cross-sectional surface of the reactor vessel.

5. The method of claim 4, wherein the cross-sectional surface is decreased multiple times in sections.

6. The method of claim 4, wherein the cross-sectional surface of the reactor vessel is decreased continuously.

7. The method of claim 1, wherein outside the first region, the liquid pressure is varied discontinuously over time.

8. A device for sonicating liquids with low-frequency high-energy ultrasound comprising a low-frequency high-energy ultrasound system comprising at least one sonotrode which projects into a reactor vessel through which the liquid passes via at least one inlet orifice and at least one outlet orifice, wherein the inlet orifice is arranged in such a manner that the liquid impinges directly on the oscillation-transducing sonotrode surface and is configured in such a manner that, in a first region adjacent to the oscillation-transducing sonotrode surface, a pressure above a pressure/amplitude characteristic line prevails, at which cavitation is reduced compared to the pressure/amplitude combination below the pressure-amplitude characteristic line, or no cavitation occurs;

wherein the device is configured to generate, in a first region adjacent to the oscillation-transducing sonotrode surface within the reactor vessel, a pressure resulting in a pressure/amplitude combination above a pressure-amplitude characteristic line, and maintain, in a second region adjacent to the first region in the reactor vessel, a pressure resulting in a pressure/amplitude combination below the pressure-amplitude characteristic line, wherein for the pressure/amplitude combination above the pressure-amplitude characteristic line, cavitation is reduced compared to the pressure/amplitude combination below the pressure-amplitude characteristic line, or no cavitation occurs;

a cone is provided in the reactor vessel, the cone tapering at an acute angle in the direction toward the oscillation-transducing sonotrode surface, at an angle between 5 degrees and 30 degrees;

wherein along a distance from the sonotrode surface in the direction of flow of the liquid, the vibration amplitude of the ultrasound injection is increased by changing a cross-sectional surface of the reactor vessel.

9. The device of claim 8, wherein the inlet orifice is implemented as an annular nozzle.

10. The device of claim 8, wherein the inlet orifice is implemented as a central nozzle.

11. The device of claim 10, wherein the central nozzle is arranged at a right angle with respect to the sonotrode surface.

12. The device of claim 8, wherein the inlet orifice is implemented as a nozzle that is laterally directed at the sonotrode surface.

13. A device for sonicating liquids with low-frequency high-energy ultrasound comprising a low-frequency high-energy ultrasound system comprising at least one sonotrode which projects into a reactor vessel through which the liquid passes via at least one inlet orifice and at least one outlet orifice, wherein the effective cross-sectional surface of the reactor vessel is configured continuously decreasing, at least in sections, at a distance from the sonotrode surface, and is configured in such a manner that, in a first region adjacent to a surface of sonotrode, a pressure above a pressure/amplitude characteristic line prevails, cavitation is reduced compared to the pressure/amplitude combination below the pressure-amplitude characteristic line, or no cavitation occurs;

wherein the device is configured to generate, in a first region adjacent to the sonotrode surface within the reactor vessel, a pressure resulting in a pressure/amplitude combination above the pressure-amplitude characteristic line, and maintain, in a second region adjacent to the first region in the reactor vessel, a pressure resulting in a pressure/amplitude combination below the pressure-amplitude characteristic line, wherein for the pressure/amplitude combination above the pressure-amplitude characteristic line, cavitation is reduced compared to the pressure/amplitude combination below the pressure-amplitude characteristic line, or no cavitation occurs, and the reactor vessel is configured to hold the liquid;

a cone is provided in the reactor vessel, the cone tapering at an acute angle in the direction toward the oscillation-transducing sonotrode surface, at an angle between 5 degrees and 30 degrees;

wherein along a distance from the sonotrode surface in the direction of flow of the liquid, the vibration amplitude of the ultrasound injection is increased by changing the cross-sectional surface of the reactor vessel.

14. The device of claim 13, wherein the cross-sectional surface is configured linearly decreasing.

15. The device of claim 13, wherein the cross-sectional surface is configured exponentially decreasing.

16. The device of claim 13, wherein the decrease of the cross-sectional surface can be implemented by the shape of the reactor vessel.

17. The device of claim 16, wherein the cross-sectional surface decreases in the form of a cone.

18. The device of claim 16, wherein the cross-sectional surface decreases in the form of a pyramid.

* * * * *